United States Patent
Han et al.

(10) Patent No.: US 10,026,564 B2
(45) Date of Patent: Jul. 17, 2018

(54) PRECIOUS METAL SWITCH CONTACT COMPONENT AND ITS PREPARATION METHOD

(71) Applicant: NANTONG MEMTECH TECHNOLOGIES CO., LTD, Jiangsu (CN)

(72) Inventors: Huisheng Han, Nantong (CN); Hongmei Zhang, Nantong (CN); Yang Ding, Nantong (CN); Zhihong Dong, Nantong (CN); Cheng Huang, Nantong (CN)

(73) Assignee: NANTONG MEMTECH TECHNOLOGY CO., LTD., Nantong (CN)

( * ) Notice: Subject to any disclaimer, the term of this patent is extended or adjusted under 35 U.S.C. 154(b) by 0 days.

(21) Appl. No.: 14/896,403

(22) PCT Filed: Sep. 15, 2014

(86) PCT No.: PCT/CN2014/090913
§ 371 (c)(1),
(2) Date: Dec. 7, 2015

(87) PCT Pub. No.: WO2016/041244
PCT Pub. Date: Mar. 24, 2016

(65) Prior Publication Data
US 2016/0372276 A1 Dec. 22, 2016

(30) Foreign Application Priority Data
Sep. 15, 2014 (CN) .......................... 2014 1 0467116

(51) Int. Cl.
*H01B 13/00* (2006.01)
*H01H 1/02* (2006.01)
(Continued)

(52) U.S. Cl.
CPC ........... *H01H 1/02* (2013.01); *C23C 18/1605* (2013.01); *C23C 18/165* (2013.01);
(Continued)

(58) Field of Classification Search
CPC . H01L 22/34; H01L 2224/27614; C25D 5/48; C23F 1/00; C23F 1/34; H01H 2011/046
(Continued)

(56) References Cited

U.S. PATENT DOCUMENTS

2006/0160276 A1* 7/2006 Brown .................. B82Y 10/00
438/149
2010/0096168 A1 4/2010 Ohtsuki
(Continued)

FOREIGN PATENT DOCUMENTS

| CN | 101341278 A | 1/2009 |
| CN | 103700517 A | 4/2014 |

(Continued)

*Primary Examiner* — Binh X Tran
(74) *Attorney, Agent, or Firm* — Treasure IP Group, LLC (57) ABSTRACT

This invention discloses a preparation method for precious metal switching contact components by means of plating masking, plating and etching processes. The plating masking process is performed by using a plating mask ink with or without a photo exposure machine. Plating of precious metals is performed by electroless plating or electro plating methods. Etching is carried out with etching solutions containing weak organic acids, weak inorganic acids or acidic buffering agents. Improvement of the etched surface gloss and prevention of the side etching are realized with the sulfur-contained compounds. The dust- and oil stain-resistances of the switch contacts are improved by increasing the etching depth. The switch contacts made by this invention are featured with the advantages of good reliability, good resistance to dust and oil stain, short contact bounce time, long service life, low cost of raw materials and so on.

9 Claims, 2 Drawing Sheets (51) Int. Cl.

| | |
|---|---|
| *H01H 11/04* | (2006.01) |
| *C23C 18/16* | (2006.01) |
| *C25D 3/46* | (2006.01) |
| *C25D 5/02* | (2006.01) |
| *C25D 5/48* | (2006.01) |
| *H01H 1/023* | (2006.01) |
| *C25D 5/12* | (2006.01) |
| *C23C 18/42* | (2006.01) |
| *C25D 3/48* | (2006.01) |
| *H01H 1/06* | (2006.01) |
| *C25D 3/54* | (2006.01) |

(52) U.S. Cl.
CPC ............ *C23C 18/1689* (2013.01); *C25D 3/46* (2013.01); *C25D 5/022* (2013.01); *C25D 5/12* (2013.01); *C25D 5/48* (2013.01); *H01H 1/023* (2013.01); *H01H 11/04* (2013.01); *C23C 18/42* (2013.01); *C25D 3/48* (2013.01); *C25D 3/54* (2013.01); *H01H 1/06* (2013.01); *H01H 2011/046* (2013.01); *H01H 2201/016* (2013.01); *H01H 2201/024* (2013.01); *H01H 2201/03* (2013.01); *H01H 2229/014* (2013.01); *H01H 2229/016* (2013.01)

(58) Field of Classification Search
USPC ................. 216/13, 18, 42, 100, 105, 106
See application file for complete search history.

(56) References Cited

U.S. PATENT DOCUMENTS

2012/0105370 A1* 5/2012 Moore ................. G06F 3/0412
    345/174
2013/0260058 A1* 10/2013 Brown ................. B82Y 10/00
    427/577
2015/0332938 A1* 11/2015 Palm ................... H01L 23/4334
    257/723

FOREIGN PATENT DOCUMENTS

| CN | 204130362 U | 1/2015 |
| JP | S57107519 A | 7/1982 |

* cited by examiner

PRECIOUS METAL SWITCH CONTACT COMPONENT AND ITS PREPARATION METHOD

CROSS REFERENCE TO RELATED APPLICATION

This application is a national stage application of a PCT application PCT/CN2014/090913, Dec. 11, 2014, entitled "A Precious Metal Switch Contact Element and Its Preparation Method," which further claims priority to Chinese Application No. 201410467116.6, filed on Sep. 15, 2014. The international application and Chinese Application are incorporated herein by reference in their entireties.

FIELD OF THE INVENTION

This invention relates to a switch contact component used for circuit switch-on or switch-off and its preparation method, which falls into the technical field of the switch contact manufacturing.

BACKGROUND

Precious metals such as gold and silver have good electrical conductivity and chemical stability, and thus they or their alloys can be used as contact materials in the switches, but their expensive prices limit their application scope. Base metals such as iron, cobalt, nickel, aluminum, copper, titanium, etc., as well as their alloy, including stainless steel, have good chemical stability in the atmospheric conditions, but their electrical conductivity when used as contact materials is usually less ideal than precious metals, their conductivity is usually less than gold and silver, and their chemical stability is poorer than precious metals such as gold and silver. Furthermore, their electrical wear resistance is generally worse than gold, silver and other precious metals. In comparison with precious metals, base metals are usually cheap, readily available and in abundant supply. As conductive materials or as contact materials, they are much less expensive than precious metals. In short, independent use of any of metals results in both advantage and disadvantages.

Precious metal plating (particularly gold plating) on contacts made from stainless steel and other base metal substrates is an effective method to improve contact performance. Technical personnel have made a lot of efforts to improve gold plating methods and the gold plating quality of the contacts. For Example, Chinese Patent Application No. 201310564337 "Process Method of Gold Plating on Mini-sized Relay Contacts and Reeds" discloses the solutions to instability of contacting resistance and statistic bonding function by using specific plating fluid formulas and improving the density and purity of the gold plating. USA Patent Application 20140045352 "Connector with Gold-palladium Plated Contacts" discloses a method for controlling the color of the binary metal alloy by adjusting the gold and palladium concentration in the binary metal alloy. Japanese Kokai Tokkyo Koho 2003-057111 discloses a technique to eliminate the pinholes in the plating and improve the corrosion resistance of silver-based contacts, by the use of a sputtering method to coat a 1 μm thick gold layer, and then by the use of electroplating method to coat a 1 μm thick gold layer on the silver-based contacts. The so-prepared contacts have good reliability even in highly corrosive gas environments.

Chinese Patent Application No. 201010557154.2 "Fabrication Process of Partial Gold Plating Sheets" and a series of patent documents filed by the same applicant and applied on the same date disclose a method to implement partial gold plating, wherein a protective dry membrane is photo-exposed selectively, so as to shelter the non-plating zone. An alkaline-dissolved protective dry membrane and an exposure machine must be used in this method. Chinese Patent Application No. 200910023466.2 "A Spare Part Laminating Method before Partial Gold Plating on Reeds" discloses a method of one-side gold plating, also using an exposure machine. U.S. Pat. No. 4,077,852 "Selective Gold Plating" discloses selectively electroplating gold on metallic surfaces containing copper using a chromate film as a plating mask. This procedure permits reduced use of gold without adversely affecting device performance. In addition, chromate films may be patterned with relatively high dimensional resolution so as to achieve gold plating patterns useful in electronic and integrated circuits. The chromate film is made by the cathodic deposition of potassium dichromate. However, when chromate is used as a plating mask, the gold electroplating conditions must be milder than the commonly used gold plating condition. Lower plating bath temperatures and lower voltage or current density, for example, must be used for the plating.

The Applicant's Chinese Patent Application No. 201310748955 "A Switch Contact Component and Its Preparation Method" discloses a three-layer laminated switch contact component: the substrate is rubber, the inter layer is a continuous base metal sheet, and the upper layer is discontinuous precious metal plating, or discontinuous binary metal composite layer of base metal plating and precious metal plating. The structure, which has good electric conductivity and stability, dust-resistance and oil stain-resistance when used as a switch contact component, is formed by printing a partial plating mask and plating. However, the contact component made by this preparation method has limited plating thickness. The plating thickness is restricted by the thickness of the plating mask printed thereon. As we know, it is difficult to obtain a very thick printed ink layer. The thickness of printed inks is usually no more than twenty microns. Therefore, the thickness of plating made by this method is less than twenty microns.

The insufficient thickness means the height of the conducting contact surface of the convex dots protruding out of the substrate is not enough, and therefore, the contact's dust resistance and oil stain resistance shall be impacted. When the plating thickness exceeds the thickness of the plating mask, the plating mask will be submersed in the plating. When submersed in the plating, the plating mask, which is electrically insulated, may spill to the contact surface and lead to an increase of contact resistance, even to a failed conductivity function. In addition, the contact angle of the printed ink on the base metal substrate is difficult to be controlled to 90°. That is, it is very difficult to make the edge of the printed ink perpendicular to the surface of the base metal substrate, and thus the edge of the plating is hardly perpendicular to the base metal substrate.

Steel, stainless steel, copper or copper alloy, nickel or nickel alloy are common base metals for the preparation of contacts. For the etching on these metals, etching solutions containing relatively strong inorganic acids such as HCl+ $HNO_3$+$FeCl_3$+caprolactam (used for stainless steel etching) (Chinese Patent Application No. 201010160309.9), $HNO_3$+ $FeCl_3$+NaCl (used for stainless steel etching) (Chinese Patent Application No. 201310100019.9), fluoboric acid or fluosilicic acid+methyl sulfonic acid or amino sulfonic acid+ water soluble ferrous salt (used for the etching of tin without corrosion to copper and nickel) (Chinese Patent Application No. 201310187160.7), nitric acid or sulfuric acid+hydrogen peroxide+specific polymers (China Patent Application No. 200910023466.2), nitric acid and/or sulfuric acid+hydrogen peroxide+ammonium+aromatic amine+nitro compounds (Chinese Patent Application No. 201110110116.7), nitric acid+nickel nitrate+iodic acid+amino acid (U.S. Pat. No. 4,556,449), sulfuric acid+peroxide+low molecular weight carboxylic acid (used for copper etching) (U.S. Pat. No. 4,462,861), sulfuric acid+nitrate+hydrogen peroxide (JP2004-52001), Ferric chloride+hydrochloric acid+high molecular compound (JP2000-336491), phosphoric acid+ hydrogen peroxide (JP2006-294797), and perchloric acid+ ceric ammonium nitrate (JP2004-59973), are used as etching solutions. Unless otherwise mentioned, the etching solutions disclosed in these patent documents are all used for the etching of nickel or nickel alloys.

Etching solutions containing organic acids were disclosed in some patent documents. Chinese Patent Application No. 201080059307.9 "Etching Solution and Semiconductor Device Manufacturing Method Using It" discloses an etching solution containing hydrogen peroxide, organic acids (citric acid and malic acid) and a small amount of phosphonic acid, which can selectively etch copper without etching nickel. Chinese Patent Application No. 200610151609.4 discloses that the etching solution mainly based on acetic acid and containing acetic acid stabilizers, organic acids, inorganic acids and salts, wherein the salts were used to control the pH value of the etching solution and to adjust the relative etching rates of copper and molybdenum.

Although these patent documents discloses a wide variety of etching solutions, it is necessary to develop new etching solutions, by which iron, cobalt, nickel, copper and their alloys are etched and good etching results, such as glossy etched metal surfaces, no side etching and no corrosion to gold, silver and other precious metal, are achieved.

SUMMARY OF THE INVENTION

The purpose of the invention: this invention is to provide a preparation method, including plating masking (printing of plating mask), plating and etching, and the products made therefrom, so as to solve the insufficiency of the dust resistance and oil stain resistance of electric contacts produced with existing techniques.

Technical Scheme: In the invention, there are many methods as disclosed for the preparation of switch contact components containing precious metal plating, however, each method is comprised of three basic working steps: plating masking, precious metal plating and etching. These methods are different from each other in the sequence of working steps.

Method 1:

1) Printing of plating mask: a 0.01-10 mm thick base metal sheet is used as the substrate, and on its upper surface, one 0.5-10 µm thick partial plating mask is printed on the partial surface of the substrate using an ink dissolvable in a solvent, an acidic solution or an alkaline solution, so that the areas on the upper surface of the substrate without plating mask are exposed with dense metallic dots, stripes or lattices, or with any combinations of metallic dots and stripes; a 0.5-10 µm thick plating mask is applied on the full undersurface of the substrate so that the plating mask fully covers the under surface; the plating masks on the upper surface and on the undersurface of the substrate are identical or different in chemical compositions; the plating mask is an water-resistant, acid-resistant or alkaline-resistant organic polymer material; alternatively, an 0.5-10 µm thick acid- or alkaline-resistant photosensitive ink is printed on the full surfaces of the base metal sheet, treated with a photo exposure machine, and then rinsed with water to remove the uncured photosensitive ink, so as to make a dotted, striped or latticed base metal surface exposed from the substrate;

2) precious metal plating: on the areas of the substrate surface without plating masks printed, a coating in thickness of 0.05-5 µm of precious metals is applied by electroplating or electroless plating; or one coating of 0.1-20 µm thick non-precious metal is plated by electroplating or electroless before the precious metal plating is plated thereon.

3) Removal of the plating mask: the plating mask, printed partially on the upper surface of the substrate, is removed by a method of dissolution or peeling, using a solvent, or an alkaline solution or an acid solution; or the cured photosensitive ink, when used as the plating mask, is removed by the dissolution with an alkaline solution, an acidic solution or a solvent.

4) Etching: an etching solution is used for selectively etching the areas where the plating mask on the upper surface of the substrate surface has already been removed as mentioned in Step 3), or where there is no precious metal plating; and the etching depth is 5%-95% of the substrate thickness so that the precious metal plating plated on the substrate protrudes out of the substrate surface; the said etching solution can be a cupric chloride etching solution containing hydrogen peroxide, urea hydrogen peroxide or peracetic acid, or a ferric chloride solution containing hydrogen peroxide, urea hydrogen peroxide or peracetic acid;

5) Bonding with rubber: the plating mask on the under surface of the substrate is removed, and then the undersurface of substrate is bonded with rubber by thermal vulcanization to form a 0.25-5 mm thick laminated sheet;

6) Punching: the laminated sheet is cut or punched into cylindrical, prismatic or elliptic granules or pills with cross sectional areas of 0.8-80 mm$^2$;

Method 2:

Method 2 is like Method 1, but includes the sequence of printing of plating mask, precious metal plating, removal of the plating masks (removal of plating masks on the upper surface and the undersurface of base metal sheet), bonding with rubber, etching and punching;

Method 3:

The Method 3, including the following sequence, may also be used to prepare the precious metal plated switch contact components with the same or similar electric conductivity as the precious metal plated switch contact component prepared by Method 1:

1) Bonding with rubber: on the undersurface of base metal sheet substrate, one layer of rubber is bonded by thermal vulcanization to form a 0.25-5 mm thick laminated sheet;

2) Printing of the plating mask: a 0.5-10 µm thick plating mask is printed on partial areas in the upper surface of the laminated sheet using an ink dissolvable in a solvent, an acidic solution or an alkaline solution, so that the areas without plating mask on the upper surface of the substrate are exposed with dense metallic dots, stripes or lattices, or with free combinations of metallic dots and lines;

3) Precious metal plating: on the areas without plating mask of the upper surface of the laminated sheet, where dotted, striped or latticed base metal surfaces are exposed, a 0.05-5 µm thick precious metal plating is applied; or one plating of 0.1-20 µm thick non-precious metal is plated before the 0.05-5 µm thick precious metal plating is plated thereon;

4) Removal of the plating mask: the plating mask printed on the partial surface of the substrate is removed from substrate surface by using a solvent, or an alkaline solution or an acid solution.

5) Etching: an etching solution is used for selectively etching the areas on the upper surface of the substrate, where the plating mask has already been removed as mentioned in Step 4), or where there is no precious metal plating, and the etching depth is 5%-95% of the substrate thickness so that the precious metal plated on the substrate protrudes out of the substrate surface; the said etching solution can be cupric chloride etching solution containing hydrogen peroxide, urea hydrogen peroxide or peracetic acid, or a ferric chloride solution containing hydrogen peroxide, urea hydrogen peroxide or peracetic acid;

6) Punching: the laminated sheet containing metallic plating is cut or punched into cylindrical, prismatic or elliptic granules or pills with cross-section areas of 0.8-80 $mm^2$; In this method, the undersurface of the base metal sheet is bonded with a rubber layer. The rubber layer has a plating resisting effect, and thus prevents the undersurface from being electroplated or being electroless plated. Therefore, the undersurface of the base metal substrate does not require a plating mask.

Method 4:

Method 4 is like Method 3, but with the sequence of bonding with rubber, printing of the plating mask, precious metal plating, removal of the plating mask, punching and etching; The plating mask is an organic polymer material, which is water-resistant but dissolved or peeled off easily by organic solvents, acid-resistant but dissolved or peeled off easily in alkaline solutions, or alkaline-resistant but dissolved or peeled off easily in acidic solutions. There should be good adhesion between the plating mask and the base metal substrate. If a water-resistant plating mask is selected, it shall not be fractured, peeled or chipped in water solutions such as electroplating baths or electroless plating baths, no matter if the water solutions are acidic, alkaline or neutral, but organic solutions can be used to dissolve or peel off the water-resistant plating mask. Similarly, an acid-resistant plating mask maintains good bonding with the metallic substrate in acidic solutions but it is dissolved or peeled off easily in an alkaline solution, and an alkaline-resistant plating mask maintains good bonding with the metallic substrate in alkaline solutions but it is dissolved or peeled off easily in an acidic solution. If precious metal plating is carried out in an acidic plating bath, an acid-resistant plating mask ink or an acid-resistant photosensitive ink should be used. If in an alkaline plating bath, an alkaline-resistant plating mask ink or an alkaline-resistant photosensitive ink should be used. A qualified plating mask can be obtained by the use of proper commercially available or homemade plating mask inks.

Precious metal electroplating or electroless plating, especially on base metal substrates, including gold plating with a gold purity of more than 99.9%, is a mature technology for us to use. The electroless gold plating produces smaller thickness of plating, only up to about 0.2 µm, while electroplating may result in thicker gold plating layer of more than 1 µm. Different gold plating process or gold plating thickness are selectable according to different requirements for the performance of the switch contact components, such as working currents and life cycles.

The etching process is critical among all of these processes. The said etching solutions or etching solutions contain 2-20% of copper chloride or ferric chloride, 0.5-10% of hydrogen peroxide, urea hydrogen peroxide or peracetic acid. Hydrogen peroxide—in the form of 30% hydrogen peroxide is added into the etching solutions. The peracetic acid in the form of 40% aqueous solution is added to the etching solutions. Hydrogen peroxide urea in the solid form is directly added to the etching solutions, or added to the etching solutions in the form of a solution diluted with distilled water at the ratio of 2:1 (distilled water: hydrogen peroxide urea). If the peroxide concentration in the etching solution is too low, the proper etching rate can't be reached. If too high, the etching solution becomes unstable and a lot of gas produced in violent reaction during etching. Concentration of 1.5-7.5% for hydrogen peroxide, hydrogen peroxide urea or peroxide acetic acid in the etching solutions are preferred.

The hydrogen peroxide urea is the adduct of hydrogen peroxide and urea, and it can be used safely. Hydrogen peroxide urea decomposes into hydrogen peroxide and urea after being dissolved in water. According to the patent literature JP10-130870, urea can inhibit the production of $NO_x$ in the etching solution. According to Chinese Patent Application No. 201210126971.1 "A Low-acidic Acid Etching Regenerative Agent and Its Acidic Etching Mother Liquid", the urea added into low acidic etching liquid may reduce side reaction and decrease material consumption. We have also not found the impairing effect of urea in the etching solution during the etching experiments. Generally, the oxidation capability of peracetic acid is higher than that of hydrogen peroxide. When peracetic acid is used in an etching solution, it can be used at even lower temperature, namely, when the etching solution is prepared using peroxide acetic acid, the etching rate and effect can be very good at a temperatures as low as 0-35° C.

Etching is a process that consumes hydrogen ions, while the presence of the above weak acid system provides hydrogen ions for etching. In the etching solution, the etching process can be steady by using the weak acid system. If a strong acid instead of a weak acid system is used in the etching solution, the etching process will become violent, producing a lot of bubbles suddenly, and even the etching reaction shall be out of control. The phenomenon of the reaction out of control is one part of metal sheet is completely dissolved, whereas the other part of the metal sheet is only etched to half of the overall metal sheet thickness. In other words, the etching rate in different parts of the metal sheet is not uniform.

As an optimization, the main composition of the said etching solution is 2-20 g of copper chloride or ferric chloride, 1-20 g of hydrogen peroxide, urea hydrogen peroxide or peracetic acid, 1-25 g of weak organic acids, weak inorganic acids, acidic inorganic salts, or pH buffering agents containing weak acids in every 100 g of the etching solution; when the etching solution is prepared with peracetic acid, weak organic acids, weak inorganic acids, acidic inorganic salts, or pH buffering agents containing weak acids can be used or not used.

The said weak organic acid can be at least one of formic acid, acetic acid, propionic acid, butyric acid, isobutyric acid, valeric acid, isovaleric acid, oxalic acid, malonic acid, succinic acid, glutaric acid, adipic acid, hydroxy acetic acid, acrylic acid, methacrylic acid, malic acid, lactic acid, tartaric acid, citric acid, gluconic acid, maleic acid, benzoic acid, phenylacetic acid, phthalic acid, terephthalic acid, acetic anhydride, phenol and nitrated phenols, salicylic acid, acetylsalicylic acid, pyruvic acid, EDTA, dichloro acetic acid, and amino acids, preferably citric acid and oxalic acid.

The said weak inorganic acids or acidic inorganic salts can be at least one of boric acid, hydrofluoric acid, sodium hypochloric acid, sulfurous acid, sodium dihydrogen phosphate, aluminum chloride, ammonium chloride, aluminum sulfate and ferric sulfate.

The said strong acid can be at least one of inorganic acids such as hydrochloric acid, sulfuric acid, nitric acid, phosphoric acid, chloric acid, perchloric acid, hydriodic acid and hydrobromic acid, or of organic acids such as trichloroacetic acid, trifluoroacetic acid and sulfonic acids.

The said pH buffering agents contain weak organic acid or weak inorganic acid, preferably the pH buffering agent containing citric acid, phthalic acid or acetic acid, further preferably citric acid-disodium hydrogen phosphate systems, citric acid-sodium citrate systems, phthalic acid-hydrochloric acid or acetic acid-sodium acetate system. The use of these compounds may make the etching solutions become stably weakly acidic and get proper etching rates. The organic acids can be used in combination. With addition of these acidic compounds, the pH of the etching solution can be controlled, and thus the etching rates can be steady.

As an optimization, in the said etching solutions, 0.005-2 g of thiourea compounds or sulfhydryl compounds are contained per 100 g of the said etching solutions; the said thiourea compounds are preferably thiourea, phenyl thiourea, diphenylthiourea, p-tolylthiourea, o-tolylthiourea, acylthiourea, thiosemicarbazide or thiosemicarbazone; the said sulfhydryl compounds are preferably thioglycollic acid or thioglycolate, mercaptosuccinic acid, 2-mercaptobenzothiazole, 2-propargyl mercaptobenzoxazole imidazole, sulfhydryl thiadiazoleoxadiazole, dimercaptothiadiazole or thioltriazole. In the etching solutions, addition of one or more of these compounds may have the etched surface brightly polished and silvery white. Meanwhile, these compounds can restrict the side etching. It is important to control the side etching, so as to prepare contact components containing the precious metal plating without sink marks, to ensure that all the plated precious metal can be fully used as contact surface, and thus to make full use of the conductivity of the precious metals.

As an optimization, 0-20 g of mixture is contained in every 100 g of the said etching solutions, for which potassium sodium tartrate tetrahydrate, sodium citrate, EDTA sodium salts are preferred. The addition of these mixtures not only helps to control the etching rate and to make the etching process steady, but also helps to improve the gloss of the etched surfaces. Among all mixtures we used, the most obvious effect to improve the gloss was obtained by the use of sodium citrate.

As an optimization, the said etching solutions contain a combination of hydrogen peroxide, urea hydrogen peroxide and peracetic acid, a combination of weak organic acids, weak inorganic acids, acidic inorganic salts and pH buffer agents containing weak acids, or a combination of copper chloride and ferric chloride.

When these compounds are contained simultaneously in the etching solution, the applicability of the etching solutions to the different etching processes is improved. It is noteworthy that the etching temperature shall be controlled to lower than 35° C. in order to prevent the intense etching reaction when peracetic acid in the etching solution is relatively excessive.

In addition to the above ingredients, the etching solutions may contain methanol, ethanol or surfactants or only water instead of methanol and ethanol. In order to add thiourea or diphenylthiourea to the etching solution, methanol, ethanol, and surfactants are used to dissolve the phenyl thiourea or diphenylthiourea, whose solubility is poor in water. As for water, pure water free of metal ion, organic impurities or particles after distillation; ion exchanged, filtered and treated with different kinds of adsorption is preferred.

It is better to use the etching solutions immediately after they are prepared, so as to prevent possible oxidation of organic acids by peroxides.

The copper chloride etching solutions containing hydrogen peroxide or urea hydrogen peroxide, or the ferric chloride etching solutions containing hydrogen peroxide or urea hydrogen peroxide, are ambient temperature etching solutions with an etching temperatures range of 20-50° C., preferably 22-35° C. When the etching solution temperature is above 20° C., the etching rate may not be too slow and the productivity may not be substantially reduced too much. When the etching temperature is higher than 50° C., the etching rate will be higher, but the solution stability becomes poor and the reaction becomes too violent, and thus it is difficult to obtain a stable etching rate and good etched metal appearance. When these two kinds of etching solutions are used to etch copper or copper alloy, steel or stainless steel, nickel or nickel alloy at temperatures of 20-30° C., the etching rate can be maintained in the range of 0.25-5 μM/min.

The copper chloride etching solutions containing peracetic acid or ferric chloride etching solutions containing peracetic acid are low temperature etching solutions, and the etching solutions are used at the temperature ranges of 0-35° C., preferably 15-25° C. Steel or stainless steel, copper or copper alloy, nickel or nickel can also be etched when the etching solutions are at temperatures of 0-10° C., but the etching rate is slow and the productivity is not high. When the etching solution temperature is in the range of 10-25° C., a relatively high and stable etching rate can be maintained. When the copper chloride etching solution is used at 20° C., the copper etching rate is 1-5 μm/min., while the SS304 stainless steel etching rate and N6 pure nickel etching rate is 0.5-3 μm/min. When the ferric chloride etching solutions are used at 20° C., the copper etching rate is 1-6 μm/min., while the SS304 stainless steel etching rate and N6 pure nickel etching rate will be 1-4 μm/min. When these etching solutions are used at temperatures higher than 35° C., the metals and the etching solutions react violently, and a lot of bubbles are produced, so the etching process is not stable and hard to control. Therefore, the etching solutions in this invention are suitably used at room temperature or relatively low temperatures, requiring no heating and granting high safety. Especially in the winter, proper etching solutions are available and usable, and no heating is required.

As an optimization, the said plating mask is an organic polymer material which is water-resistant but can easily be dissolved or peeled off by organic solvents, acid-resistant but can easily be dissolved or peeled off by alkaline solutions, or alkaline-resistant but can easily be dissolved or peeled off by acid solutions.

A kind of switch contact component plated with precious metals, used as switch conducting contacts, capable of electrically connecting switch contacts on circuit boards, and capable of electrically conducting through electric circuits, are in the shapes of small cylindrical, elliptical or prismatic granules or pills with cross sectional areas of 0.8-80 mm² and thicknesses of 0.5-10 mm, with multi-ply laminated structures.

The under layer is a rubber, the interlayer is a continuous base metal sheet whose upper surface is partially etched, and the upper layer is a precious metal plating in the shape of convex dots, stripes or lattices, or in the shape of any combination of convex dots, stripes and lattices, or is a bimetallic plating of precious metal and base metal in the shape of any combination of convex dots, stripes and lattices; the said base metal plating is sandwiched between the base metal substrate and the precious metal plating; the upper surface of the base metal substrate with the covering of a partially coated precious metal plating or of a partially coated bimetallic plating of base metal and precious metal is etched.

The material of the said base metal sheet can be magnesium, aluminum, titanium, chromium, manganese, iron, cobalt, nickel, copper, zinc, niobium, tin, molybdenum, tantalum, tungsten or the alloy of any one of them; the said base metal sheet is a single or pure metal material, or is made of different metal materials compounded in layered structures; the said base metal sheet material could preferably be stainless steel, nickel or nickel alloy, copper or copper alloy, which have high etching rates in the etching solutions, whereas gold, silver, ruthenium, rhodium, palladium, osmium, iridium, platinum, or alloy mainly based on these metals are basically not be etched;

The said precious metal plating could be gold, silver, ruthenium, rhodium, palladium, osmium, iridium, platinum or an alloy of any of the above, preferably silver or gold.

The material of the said rubber layer is natural rubber or synthetic rubber; preferably ethylene-propylene-diene monomer rubber (EPDM) and silicone rubber; EPDM and silicone rubber have a good weathering resistance, and have long service life in the atmosphere. Moreover, their prices are low and suitable for use in the switch contact components;

The said convex dots are cylinders, prisms, pillar bodies or protrusions with cross sections variable with axes. Their top surface diameter or circumference diameter is 0.1-2 mm, and the spacing between adjacent convex dots is 0.05-2 mm.

The said stripes are either curves or straight lines, parallel or not parallel to each other. The spacing between parallel adjacent stripes is 0.1-2 mm. The width of the stripes is fixed or variable, in the range of 0.02-2 mm.

The sizes of the said lattices are fixed or variable. The width of the latticed lines is in the range of 0.02-2 mm, and the void area between the latticed lines is in the range of 0.05-5 mm$^2$.

The height of the said convex dot (cylinder, prism, pillar body or protrusion), stripe or lattice is the sum of the thickness of the precious metal plating, the thickness of base metal plating and the etched depth of base metal sheet, and the value is in the range of 0.2 μm-9.5 mm.

As an optimization, the said rubber is EPDM or silicone rubber, the said base metal sheet is stainless steel, nickel or nickel alloy, copper or copper alloy, the said base metal plating material is nickel or nickel alloy, cobalt or cobalt alloy, and the said precious metal plating material is gold with purity of higher than 99%.

As an optimization, the thickness of the base metal plating is 1.5-10 times the thickness of the precious metal plating in the bimetallic plating made from a base metal plating and a precious metal plating, in order to achieve the purpose of economical use of precious metal, and to ensure that the contact components have good electrical conduction performance.

As an optimization, the said gold plating is prepared by electroless plating or electroplating.

Beneficial effects: this invention discloses a method characterized with controllable thickness of etching, which does not follow the method described in Chinese Patent Application No. 201310748955 "A Switch Contact Component and Its Preparation Method", wherein the plating thickness or the height of protrusions is restricted by the thickness of the plating masks. The switch contacts made according to this instant invention have a much better dust resistance, oil stain resistance and a more stable conductive properties, because this invention makes the precious metal plating more protruded out of the surface of the base metal substrate. The height of the precious metal plating is the sum of the precious metal plating thickness, the base metal plating thickness and the etching depth of the base metal substrate, and thus a wider range of the heights could be selected. The so-prepared switch contacts have the advantages such as good conduction reliability, good dust resistance, good oil resistance, short contact bounce time, long service life and low raw material cost. The plating mask printing, plating and etching processes used in the present invention are highly reliable and easy to be manufactured. Especially, the switch contact components prepared by the method disclosed in the instant invention is capable of controlling the etching depth in a large range, thus greatly improving the contacts dust resistance and oil stain resistance.

DETAIL DESCRIPTION OF THE EMBODIMENTS

Figure 1:
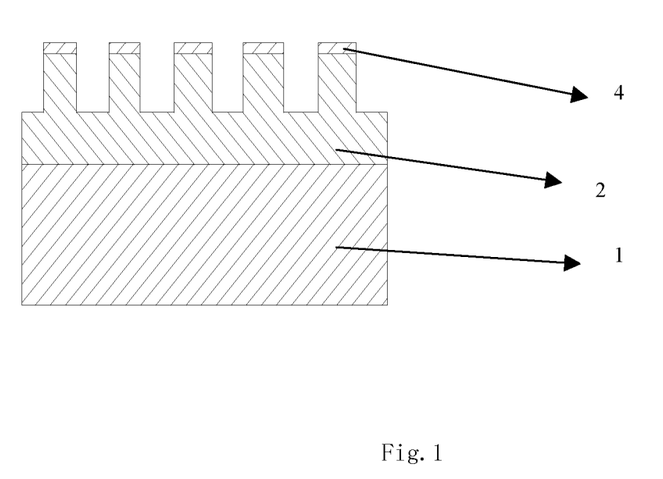
FIG. 1 is a structure sketch of the switch contact without a base metal plating.
Figure 2:
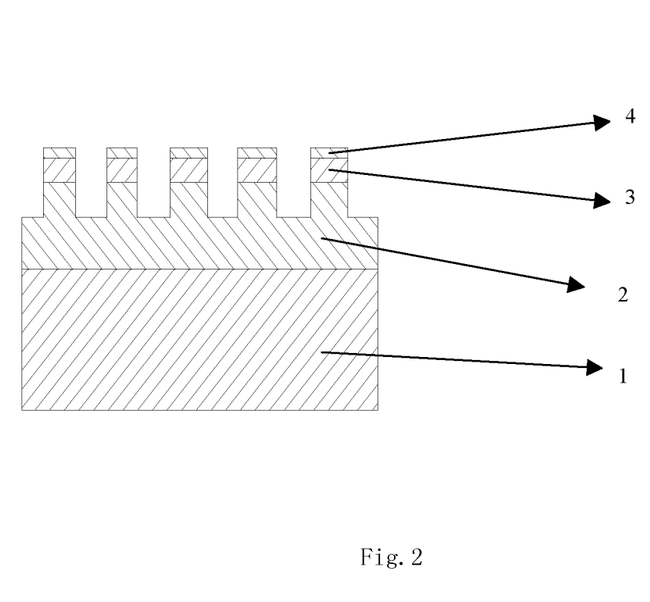
FIG. 2 is a structure sketch of the switch contact with a base metal plating.

Further explanation of the present invention is made with examples as follows. A switch contact component plated with precious metal, used as the conducting contact to electrically connect the circuit on a circuit board, is in a shape of a small cylindrical, elliptical or prismatic granule or pill with a thickness of 0.5-10 mm and a cross-sectional area of 0.8-80 mm$^2$, with a multi-ply laminated structure: The under layer is a rubber layer 1; the interlayer is a continuous base metal sheet whose upper surface is partially etched 2, and the upper layer is a precious metal plating in the shape of convex dots, stripes and lattices 4, or in the shape of any combination of convex dots, stripes and lattices 4, or is a bimetallic plating consisting of a base metal plating 3 and a precious metal plating 4 in the shape of any combination of convex dots, stripes and lattices; the said base metal plating 3 is sandwiched between the base metal sheet 2 and the precious metal plating 4; the upper surface of the base metal sheet 2 is etched under the masking of the precious metal plating 4, or under the masking of a bimetallic plating of the base metal plating 3 and the precious plating 4.

EXAMPLE 1

Bonding of stainless steel and silicone rubber: a 0.10 mm thick SUS304 stainless steel sheet is cleaned by alkaline detergent to remove oil stain, then flushed with water, and then soaked in 5% dilute hydrochloric acid for 30 seconds, then washed out with deionized water. After drying by cold air, a methyl vinyl silicone rubber containing 1% vinyl tris(tert-butylperoxy) silane (VTPS) and 0.5% dicumyl peroxide (DCP) and the stainless steel sheet are placed in a mold cavity, whose surface had been coated with Teflon. and then one side of the stainless steel sheet is bonded with silicone rubber by thermal vulcanization at 175° C. for 8 minutes to form a 1.0 mm thick laminated composite of stainless steel and silicone rubber. Methyl vinyl silicone rubber such as SE 4706U produced by Dow Corning Toray, KE 961U produced by Shin Etsu or other brands available commercially are all usable. VTPS is a coupling agent containing peroxide, which can make the vinyl-containing silicone rubber crosslinked, and also promote the adhesion between vinyl-containing silicone rubber and metal.

Printing of plating mask ink: on the stainless steel surface of the laminated composite, 0.25 mm wide lines are printed with plating mask ink, at the interval of 0.25 mm between two adjacent lines. The thickness of the printed ink is 2.0-20.0 µm. Plating mask inks with good bonding to stainless steel, either homemade or commercially available, can be selected for this application. For examples, acid-resistant plating mask ink such as PR2000SA produced by Chung Yu Industry Corporation, Taiwan and ultraviolet-curable acid-resistant ink THS-19 produced by Denbishi Fine Chemical (Kunshan) Co., Ltd. can be selected. In this Practical Example, a homemade acid-resistant plating mask ink, which is dissolvable in alkaline solutions, and the acid-resistant ink PR2000SA were used respectively.

Gold plating: before gold plating, the laminated composite sheet with printed plating mask ink is cleaned by a neutral or acidic detergent, or by organic solvents such as ethanol or isopropanol. Using either electroless plating or electroplating, one plating of 0.2 µm thick gold is plated, or 0.1-10 µm thick nickel or nickel alloy plating is plated before the gold plating is plated, on the areas where the stainless steel is exposed out of the laminated composite. In other words, the gold plating is plated only on the areas without plating mask on the stainless steel surface of the laminated composite. As a result, switch contacts as shown in FIG. 1 and in FIG. 2 would be obtained respectively. In the process of electroless gold plating or gold electroplating, acidic electroless gold plating bath or acidic gold electroplating bath is used.

Removal of the plating mask: the laminated composite with gold plating is washed with 5% sodium hydroxide solution to remove the plating mask on the stainless steel surface of the laminated composite, then a laminated composite with striped gold plating on the stainless steel surface is obtained.

Etching: the laminated composite with striped gold plating, which does not have plating mask thereon, is immersed in the following etching solution, to selectively etch the exposed stainless steel on the laminated composite. The areas with gold plating is protected by the gold plating from being etched. Etching is carried out at room temperature. The etching solution temperature is controlled at 25-28° C., and the etching time is controlled to be about 15 minutes. As a result, the stainless steel substrate is etched to a depth of 0.050-0.075 mm. Then the laminated composite is taken out of the etching solution, rinsed with water and then rinsed with de-ionized water. The etching solution formula is: 8 g of ferric chloride, 4 g of urea hydrogen peroxide, 8 g of citric acid, 5 g of sodium citrate, 0.1 g of thiosemicarbazide, and the rest being water in every 100 g of the etching solution. The gold plating on the laminated composite is not etched and the side etching is slight by the use of the etching solution. Moreover, the etched surface is relatively glossy and silvery white.

Punching: the etched laminated composite is punched to get small pills in diameter of 2-10 mm. Being bonded together with other rubber by thermal vulcanization to prepare contact-containing rubber keypads, the pills are used as switch contacts. These switch contacts are featured with good dust resistance, good oil stain resistance, good contact bounce-proof property and longer service life. In addition, the precious metal gold is less consumed and thus the raw material cost is reduced.

EXAMPLE 2

On one side of the stainless steel sheet mentioned in Practical Example 1, the plating mask is applied, and the other side is fully covered with a plating mask of the same composition in the same thickness. And then gold plating is applied as specified in Practical Example 1. The plating mask on the gold plated side of the stainless steel sheet is cleaned off by 5% sodium hydroxide solution and then the etching process is carried out in a way as mentioned in Example 1. After that, the plating mask on another side of the stainless steel substrate is washed off by using 5% sodium hydroxide solution. The non-gold plated side of the stainless steel sheet and the silicone rubber are bonded by thermal vulcanization to form a 1 mm thick laminated composite sheet of stainless steel and silicone rubber with gold plated on the stainless steel surface. After punching of this laminated composite sheet, small pills in diameters of 2-10 mm are obtained. These small pills are to be used as the switch contacts with basically the same properties as those prepared in Example 1.

EXAMPLE 3

All the procedural steps are the same as in Example 1, except for the gold plating, which shall be changed to silver plating. The silver plating is prepared by either electroplating or electroless plating. The thickness of the silver plating is 2.5 µm. In order to prevent the discoloration of the silver plating, the silver plating layer can be subjected to post-treatments, such as bright-dipping, chemical and electrochemical passivation, coating with silver plating antioxidant or protective agent, etc.

EXAMPLE 4

After silver plating carried out as described in Practical Example 3, once again with electroless or electroplating, gold plating in thickness of 0.1 µm will be applied thereto, then the removal of plating mask, etching, punching are conducted in accordance with the Practical Example 1.

EXAMPLE 5

One 0.1 mm thick sheet of nickel with a purity of more than 99.5% is bonded with silicone rubber by thermal vulcanization to for a 1 mm thick laminated composite. The nickel surface in the laminated composite is printed with plating mask ink, so as to make small evenly-distributed circles of nickel exposed out of the laminated composite. The diameters of the circles is 0.25 mm, and the distance between the centers of two adjacent circles is 0.75 mm. A 1 µm thick and more than 99.5% pure gold plating is applied on the circles. The plating mask is removed. The punching process and the etching process are carried out successively; or the etching process and the pouching process are carried out successively. Switch contact pills with a diameter of 2-10 mm are thus made.

In this embodiment, a peroxyacetic acid-containing etching solution is used. Every 100 g of the etching solution contains copper chloride 7.5 g, 20% peroxyacetic acid 12 g, oxalic acid 8 g, Disodium ethylene diamine tetraacetate 8 g, 2-mercaptobenzothiazole 0.1 g, the rest is water. The etching temperature is 18° C., and the etching time is 5 minutes. The etching depth obtained in the nickel sheet is approximately 30 µm. This etching solution does not corrode the gold plating on the nickel sheet. The side etching is slight. The etched surface obtained is glossy and silvery white.

In the every switch contact made in the Examples 1-5, there is a rubber layer. The rubber layer makes the bonding between the switch contact and other rubber by thermal vulcanization easy, so that the rubber keypads of the switch contact with patterned precious metal plating are made easily. The switch contact with patterned precious metal plating has good electric conduction reliability, good dust- and oil stain-resistance, short contact bounce time, good electrical wear resistance, long service life and low raw material cost.

As to the ordinary technical personnel in this field of technology, they may make some change, improvement or modification. For examples, other soluble Fe(III) salts instead of ferric chloride, or other soluble Cu(II) salts instead of copper chloride are used in the etching solutions. Thermoplastic elastomers, polyurethanes or plastics instead of silicone rubber are used to prepare the switch contacts with precious metal plating. Providing that no principle of the invention is deviated, these change, improvements and modifications are still within the protection scope of this invention.

We claim:

1. A method for preparing a precious metal switch contact component is characterized by comprising the following processing steps
   1) Printing a plating mask ink
      using a base metal sheet of 0.01-10 mm in thickness as a substrate;
      printing an ink dissolvable in a solvent, an acid solution or an alkaline solution on an upper surface of the substrate in thickness of 0.5-10 μm as a plating mask;
      leaving areas without plating mask covered with dotted, striped or latticed base metal surface, or base metal dots combined with stripes;
      printing the plating mask of thickness 0.5-10 μm on an undersurface of the substrate so as to completely cover the undersurface;
      wherein the coating on the upper surface and the undersurface of the substrate is different or identical in the material composition;
      said plating mask is an organic polymer material, ink or coating, which is water resistant but dissolvable or peeled in organic solvents, or which is acid-resistant but dissolvable or peeled in alkaline solutions, or which is alkali-resistant but dissolvable or peeled in acidic solutions;
      or the printing a plating mask ink step includes
   printing an acid- or alkaline-resistant photosensitive ink in thickness of 0.5-10 μm which is subsequently used as the plating mask, on both surfaces of the base metal sheet;
      treating both surfaces of the substrate with a photo exposure machine, and then rinsing both surfaces of the substrate with water to remove uncured photosensitive ink, so as to make a dotted, striped or latticed base metal surface exposed from the substrate;
   2) Plating of precious metals:
      depositing a coating or plating in thickness of 0.05-5 μm of precious metals by electroplating or electroless plating on areas of the substrate surface without plating mask printed; or depositing a coating or plating of 0.1-20 μm thick base metal before depositing a coating or plating in thickness of 0.05-5 μm of precious metals by electroplating or electroless plating;
   3) removing of the plating mask:
      removing the plating mask, printed on the upper surface of the substrate, by using a solvent, or an alkaline solution or an acid solution in a manner of dissolution or peeling; or removing cured photosensitive inks on both surfaces, when used as the plating masks by dissolution with an alkaline solution, an acidic solution or a solvent
   4) Etching:
      using an etching solution for selective etching of the areas where the plating mask on the upper surface of the substrate has already been removed as in Step 3), or where there is no precious metal plating,
      wherein the etching depth is 5%-95% of the substrate thickness so that the precious metal plating plated on the substrate protrudes out of the upper surface of the substrate;
      wherein said etching solution is
         a cupric chloride etching solution containing hydrogen peroxide, urea hydrogen peroxide or peracetic acid, or
         a ferric chloride solution containing hydrogen peroxide, urea hydrogen peroxide or peracetic acid;
   5) Bonding with rubber:
      removing the plating mask on the undersurface of the substrate, and then bonding the undersurface of substrate with rubber by thermal vulcanization to form a 0.25-5 mm thick laminated sheet;
   6) Punching:
      cutting or punching the laminated sheet into cylindrical, prismatic or elliptic disks with cross-sectional areas of 0.8-80 mm$^2$; and
      obtaining a precious metal switch contact component,
      wherein said precious metal is selected from gold, silver, ruthenium, rhodium, palladium, osmium, iridium, and platinum or an alloy of any of them.

2. The method of claim 1, wherein said etching solution containing
   2-20 g of copper chloride or ferric chloride,
   1-20 g of hydrogen peroxide, urea hydrogen peroxide or peracetic acid,
   1-25 g of weak organic acids, weak inorganic acids, acidic inorganic salts, or pH buffering agents containing weak acids, or 0.1-5 g of strong acids in every 100 g of the etching solution;
   wherein the preparation of etching solution with peracetic acid requires the use of or no use of weak organic acids, weak inorganic acids, acidic inorganic salts, or pH buffering agents containing weak acids;
   wherein the weak organic acids is selected from the group consisting of formic acid, acetic acid, propionic acid, butyric acid, butyric acid, isobutyric acid, valeric acid, isovaleric acid, oxalic acid, malonic acid, succinic acid, glutaric acid, adipic acid, hydroxy acetic acid, acrylic acid, methacrylic acid, malic acid, lactic acid, tartaric acid, citric acid, gluconic acid, maleic acid, benzoic acid, phenyl acetic acid, phthalic acid, terephthalic acid, acetic anhydride, phenols, salicylic acid, acetyl salicylic acid, pyruvic acid, chloroacetic acid, dichloro acetic acid, trichloro acetic acid, ethylene diamine tetraacetic acid, triglycolamidic acid, sulfinic acids, amino acids and phosphonic acids; citric acid and oxalic acid;
   wherein said weak inorganic acids or acidic inorganic salts are at least one of boric acid, hydrofluoric acid, hypochlorite, sulfurous acid, sodium dihydrogen phosphate, aluminum chloride, ammonium chloride, aluminum sulfate, ferric sulfate;

wherein said strong acids are at least one of strong inorganic acids selected from hydrochloric acid, sulfuric acid, nitric acid, phosphoric acid, chloric acid, perchloric acid, hydriodic acid and hydrobromic acid, or strong organic acids selected from trichloroacetic acid, trifluoroacetic acid and sulfonic acids;

wherein said pH buffering agents contain weak organic acids or weak inorganic acids, selected from the group consisting of citric acid, phthalic acid or acetic acid, citric acid-disodium hydrogen phosphate system, citric acid-sodium citrate system, and phthalic acid-hydrochloric acid or acetic acid-sodium acetate.

3. The method of claim 1 is characterized in that the etching solution contain 0.005-2 g of thiourea compounds or sulfhydryl compounds per 100 g of the etching solution; said thiourea compounds are thiourea, phenyl thiourea, diphenylthiourea, p-tolylthiourea, o-Tolylthiourea, acylthiourea, thiosemicarbazide orthosemicarbazone; the said sulfhydryl compounds are thioglycollic acid or thioglycolate, mercaptosuccinic acid, 2-mercaptobenzothiazole, 2-propargyl mercaptobenzoxazole imidazole, sulfhydryl thiadiazoleoxadiazole, dimercaptothiadiazole or thioltriazole compounds.

4. The method of claim 1 is characterized in that said etching solution contain 20 g or less of complexing agents in every 100 g of the etching solution; the complexing agent are potassium sodium tartrate tetrahydrate, sodium citrate, sodium ethylene diamine tetraacetate or sodium gluconate.

5. The method of claim 1 is characterized in that said etching solution contain
a mixture of hydrogen peroxide, urea hydrogen peroxide, peracetic acid,
a mixture of weak organic acids, weak inorganic acids, acidic inorganic salts and weak acid-containing pH buffering agents,
or a mixture of copper chloride and ferric chloride.

6. The method of claim 1, wherein the switch contact component
having precious metal plated thereon,
configured to be used as switch contact to electrically connect a circuit in a circuit board,
in the shape of the cylindrical, elliptical or prismatic disk with the cross sectional area of 0.8-80 mm$^2$ and a thickness of 0.5-10 mm, in a multi-ply laminated structure,
is characterized in that
an under layer of the switch contact component is the rubber;
an interlayer of the switch contact component is the base metal sheet and the upper surface of the switch contact component is partially etched; and
the upper layer of the switch contact component is
the precious metal plating in a shape of convex dots, stripes or lattices, or any combination thereof; or
a bimetallic plating of precious metal and base metal in the shape of any combination of convex dots, stripes and lattices; wherein the base metal plating in the bimetallic plating is sandwiched between a base metal sheet and the precious metal plating; a upper surface of the base metal sheet, which is partially covered with a precious metal plating or bimetallic plating of base metal and precious metal, is etched;

wherein said base metal sheets are made of magnesium, aluminum, titanium, chromium, manganese, iron, cobalt, nickel, copper, zinc, niobium, tin, molybdenum, tantalum, tungsten, or an alloy of any of them; said base metal sheet is of a single or pure metal material, or is a laminated structure composed of a different metal material including stainless steel, nickel or nickel alloy, copper or copper alloy;

wherein the material for the base metal plating is titanium, iron, cobalt, nickel, copper, zinc, molybdenum, tungsten or an alloy of any of them; nickel or nickel alloys, cobalt or cobalt alloys are selected for the base metal plating;

wherein the material for the precious metal plating is gold, silver, ruthenium, rhodium, palladium, osmium, iridium, platinum or an alloy of any of them; silver or gold are selected for the precious metal plating;

wherein the rubber is made of natural rubber or synthetic rubber, including EPDM rubber and silicone rubber;

wherein said convex dots are cylinders, prisms, pillar bodies or protrusions with cross sections variable with axes, their top surface diameters or circumcircle diameters being 0.1-2 mm, and the spacing between the adjacent convex dots being 0.05-2 mm;

wherein said stripes are curves or straight lines, either parallel or not parallel; the parallel adjacent stripes are spaced by 0.1-2 mm; the stripe width is variable or fixed in the range of 0.02-2 mm;

wherein the latticed line width is 0.02-2 mm, spaced by a void area of 0.05-5 mm$^2$;

wherein a height of the convex dots, stripes and lattices equals to a sum of the thickness of the precious metal plating, the thickness of base metal plating and the etching depth in the base metal substrate, and is between 0.2 μm and 9.5 mm.

7. The method of claim 6, wherein the switch contact components are characterized in that said rubber is ethylene-propylene-diene monomer rubber or silicone rubber, the base metal substrate is stainless steel, nickel or nickel alloy, copper or copper alloy; the base metal plating material is nickel or nickel alloy, cobalt or cobalt alloy; and the precious metal is gold with purity of more than 99% by weight.

8. The method of claim 6, wherein the switch contact components are characterized in that the base metal plating is 1.5-10 times as thick as the precious metal plating in the bimetallic plating of base metal and precious metal.

9. The method of claim 6, wherein the switch contact components are characterized in that said gold plating is made by either electroless plating or electroplating.

* * * * *